United States Patent [19]

Unno

[11] Patent Number: 4,893,237

[45] Date of Patent: Jan. 9, 1990

[54] INTERCONNECTED SALES DATA REGISTRATION AND PAYMENT SETTLEMENT SYSTEM

[75] Inventor: Shohei Unno, Numazu, Japan

[73] Assignee: Tokyo Electric Co., Ltd., Tokyo, Japan

[21] Appl. No.: 361,832

[22] Filed: May 31, 1989

Related U.S. Application Data

[63] Continuation of Ser. No. 27,808, Mar. 19, 1987, abandoned.

[30] Foreign Application Priority Data

Mar. 27, 1986 [JP] Japan .................................. 61-69242

[51] Int. Cl.⁴ ............................................. G07G 1/12
[52] U.S. Cl. .................................................... 364/405
[58] Field of Search ................. 364/405, 404; 235/379

[56] References Cited

U.S. PATENT DOCUMENTS

| | | | |
|---|---|---|---|
| 4,360,872 | 11/1982 | Suzuki | 364/405 |
| 4,398,250 | 8/1983 | Hosono | 364/404 |
| 4,471,434 | 9/1984 | Iwawaki | 364/405 |
| 4,495,627 | 1/1985 | Nishimura | |
| 4,692,760 | 9/1987 | Unno | 340/756 |
| 4,713,760 | 12/1987 | Yamada | 364/405 |

FOREIGN PATENT DOCUMENTS

| | | |
|---|---|---|
| 0167860 | 1/1986 | European Pat. Off. |
| 49-15368 | 4/1974 | Japan. |
| 59-178576 | 10/1984 | Japan. |
| 2119988 | 11/1983 | United Kingdom. |

Primary Examiner—Jerry Smith
Assistant Examiner—Steven Kibby
Attorney, Agent, or Firm—Frishauf, Holtz, Goodman & Woodward

[57] ABSTRACT

A sales data registration and payment settlement apparatus includes a number of register terminals for registering sales data of each article to be to be purchased by a customer, and for transmitting the sales data and total sales amount data for each customer to an electronic cash register (ECR) located away from the register terminals. The ECR includes a number of memories for storing data, transmitted from the register terminals when the sales related data for each customer is fully compiled, a printer, and a control unit for driving the printer on the basis of the sales data and total sales amount data for each customer, so that these data items are printed on a receipt. A register terminal associated with each customer arriving at the ECR is designated by way of corresponding call keys on the ECR.

8 Claims, 9 Drawing Sheets

| (T/M A) | | |
|---|---|---|
| RECEIPT NO | TOTAL NUMBER | TOTAL AMOUNT |
| | | |
| | | |
| | | |

R5 → (T/M A) row
R5A → data row

| T/M B | | |
|---|---|---|
| RECEIPT NO | TOTAL NUMBER | TOTAL AMOUNT |
| | | |
| | | |
| | | |

R6 → T/M B row
R6A → data row

F I G. 6C

| FLA | FLB |
|---|---|

INTERCONNECTED SALES DATA REGISTRATION AND PAYMENT SETTLEMENT SYSTEM

This application is a continuation of application Ser. No. 07/027,808, filed Mar. 19, 1987, now abandoned.

BACKGROUND OF THE INVENTION

The present invention relates to a sales data registration apparatus including a register terminal and an electronic cash register.

In a large supermarket, a two-cashier electronic cash register system is employed to smoothly perform the resgistration at a checkout counter. The two-cashier electronic cash register system comprises one register terminal for entering only sales data such as the department (DPT) code of each article for sale, the total sales amount for each customer, the number of articles sold, etc., and one electronic cash register for settling the sales transaction, on the basis of the total amount registered by the register terminal and represented by the sales data. A pair of a register terminal and an electronic cash register are arranged one behind the other.

With the two-cashier electronic cash register system, a customer first goes to the register terminal located at the sales area side, in order to have purchase articles registered. She or he then pays money at the electronic cash register located at the exit side, and receives a receipt.

The two-cashier electronic cash register system, however, has the following drawback:

An individual customer often purchases a larger number of articles in a supermarket than in retail stores which often carry only a specific (i.e. narrower) range of articles. Consequently, the time spent paying money and receiving change at the electronic cash register is inevitably shorter than that spent registering articles at the register terminal. Therefore, customers may have to form a long queue at the register terminals, while the cashiers at the electronic cash registers must wait a relatively long time for the arrival of these same customers. As a result, smooth and efficient sales registration cannot be achieved.

SUMMARY OF THE INVENTION

It is an object of the present invention to provide a sales data registration apparatus having a register terminal and an electronic cash register, and one that is capable of efficiently registering sales data.

In order to achieve the above object, a sales data registration apparatus is provided, comprising a plurality of register terminals each having a keyboard with a plurality of operation keys and at least one specific key, first memory means, and control means for writing, in the first memory, sales data and total sales amount data for each customer, the sales data and the total sales amount data being generated upon operation of the operation keys, and for reading out and generating the sales data and the total sales amount data from said first memory means upon operation of the above specific key; and an electronic cash register having input means for independently receiving data output from the register terminals, a plurality of memory means for storing sales data and total sales amount data for each customer, a plurality of call keys, for respectively designating the register terminals, the printing means, and the control means for reading out, from one of the memory means, the sales data and the total sales amount data output from a designated register terminal, and for driving the printing means, to print the readout data on a receipt, upon operation of a designated call key.

According to the present invention, a plurality of register terminals are connected to one electronic cash register. The time required to register sales data at the plurality of register terminals can thus be substantially equal to that required to settle sales transactions at the one electronic cash register. Therefore, sales data registration operations can be efficiently performed.

DETAILED DESCRIPTION OF THE PREFERRED EMBODIMENT

Figure 1:
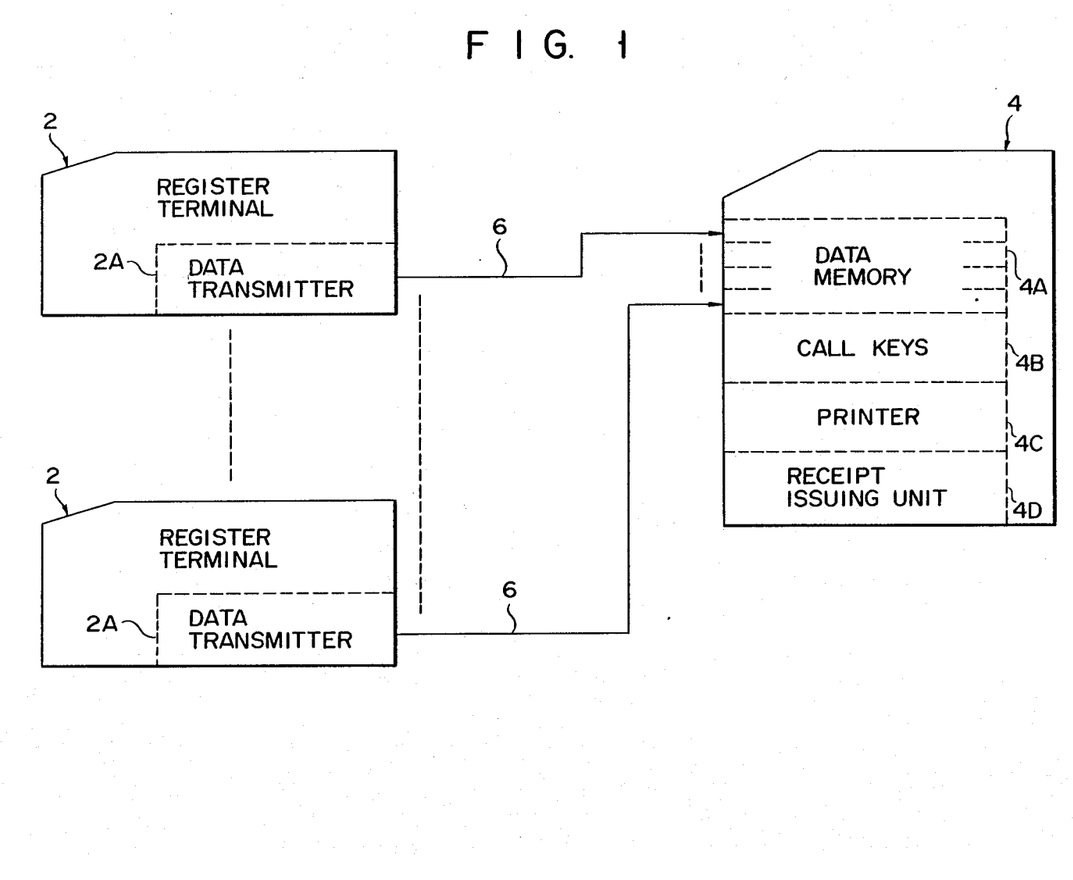
FIG. 1 is a block diagram showing a schematic configuration of a sales data registration apparatus according to the present invention.

FIG. 1 is a block diagram showing a schematic configuration of a sales data registration and payment settlement apparatus according to one embodiment of the present invention. The sales data registration apparatus includes a plurality of register terminals 2 for registering sales data of each article and one electronic cash register 4 coupled to terminals 2 through transmission lines 6. Each terminal 2 includes data transmitter 2A. Sales data of each article and total sales amount of each customer are sent from transmitter 2A to cash register 4 through corresponding line 6. Cash register 4 comprises data memory 4A having a plurality of memory areas for storing, sales data and total sales amount data supplied from terminals 2 for each terminal; a plurality of call keys 4B for respectively accessing terminals 2; printer 4C responsive to operation of each call key 4B to print sales data and total sales amount data corresponding to the accessed terminal and stored in data memory 4A; and receipt issuing unit 4D for issuing the printed receipt.

In a sales data registration apparatus having the above arrangement, sales data and total sales amount data registered at register terminals 2 are sent to electronic cash register 4 and stored in data memory 4A for each terminal. In cash register 4, when one of call key 4B is depressed, the sales data and total sales amount data, both of which correspond to terminal 2 designated by the depressed call key, are printed on a receipt. A settlement of the total amount is made, and the customer pays for it.

Figure 2:
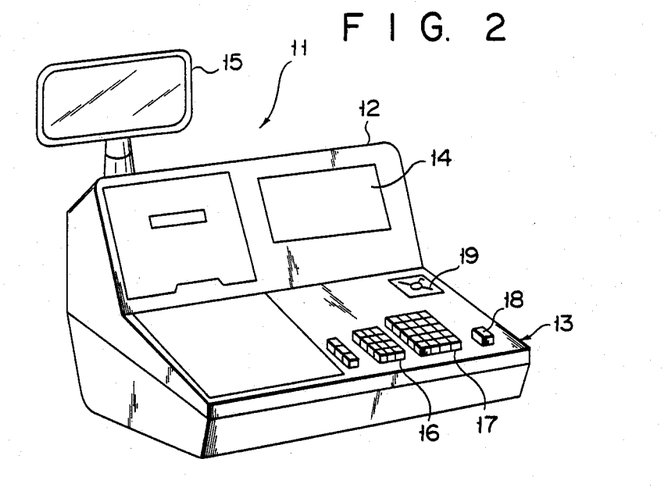
FIGS. 2 and 3 are perspective views of a register terminal and an electronic cash register used in a sales data registration apparatus according to an embodiment of the present invention.

A sales data registration apparatus according to this embodiment will be described with reference to FIGS. 2 to 6C. FIG. 2 shows an outer appearance of register terminal 11A. Terminal 11A includes keyboard 13 arranged on the front surface of housing 12, display 14 arranged on the front surface to display sales amount data and a DPT code, and display 15 arranged in the upper portion of housing 12. Sales registration keys such as numeral keys 16 for entering numeral data such as a sales amount of each article and the number of sold articles, DPT keys 17 for entering DPT codes of articles, and total key 18 for calculating a total amount are arranged in keyboard 13. Control key 19 is arranged near keyboard 13 to control power on/off operation and to select the type of operation such as a "register" program.

Register terminal 11B has the same arrangement as that of register terminal 11A. In this embodiment, two register terminals 11A and 11B are commonly coupled to an electronic cash register.

Figure 3:
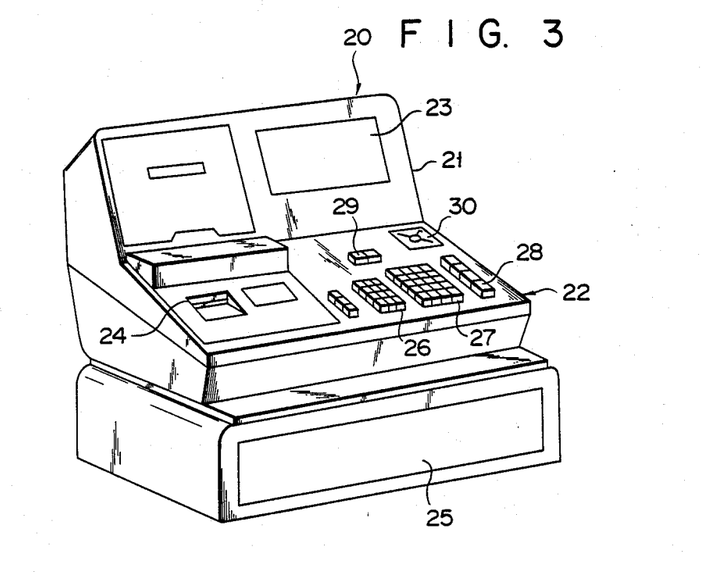

FIG. 3 shows the outer appearance of electronic cash register 20. Cash register 20 comprises keyboard 22 arranged on the front surface of housing 21 and display 23 arranged in the upper portion of housing 21 to display a total sales amount, an amount tendered, and change in the same manner as in register terminal 11A. Cash register 20 also includes receipt issuing port 24 and drawer 25 for storing cash, which are respectively arranged in the intermediate and lower portions of housing 21. Keyboard 22 includes numeral keys 26 for entering an amount tendered, an additional sales amount, and the amount of additionally sold articles, DPT keys 27 for entering DPT codes of additionally sold articles, AT/TL (Amount Tendered/Total) key 28 used for totalling the sales amounts, and a pair of call keys 29, each of which is used to designate the corresponding one of terminals 11A and 11B. Control key 30 is arranged near keyboard 22.

Control key 30 controls power on/off operation and causes a CPU to execute "registration" and "settlement" operations.

Figure 4:
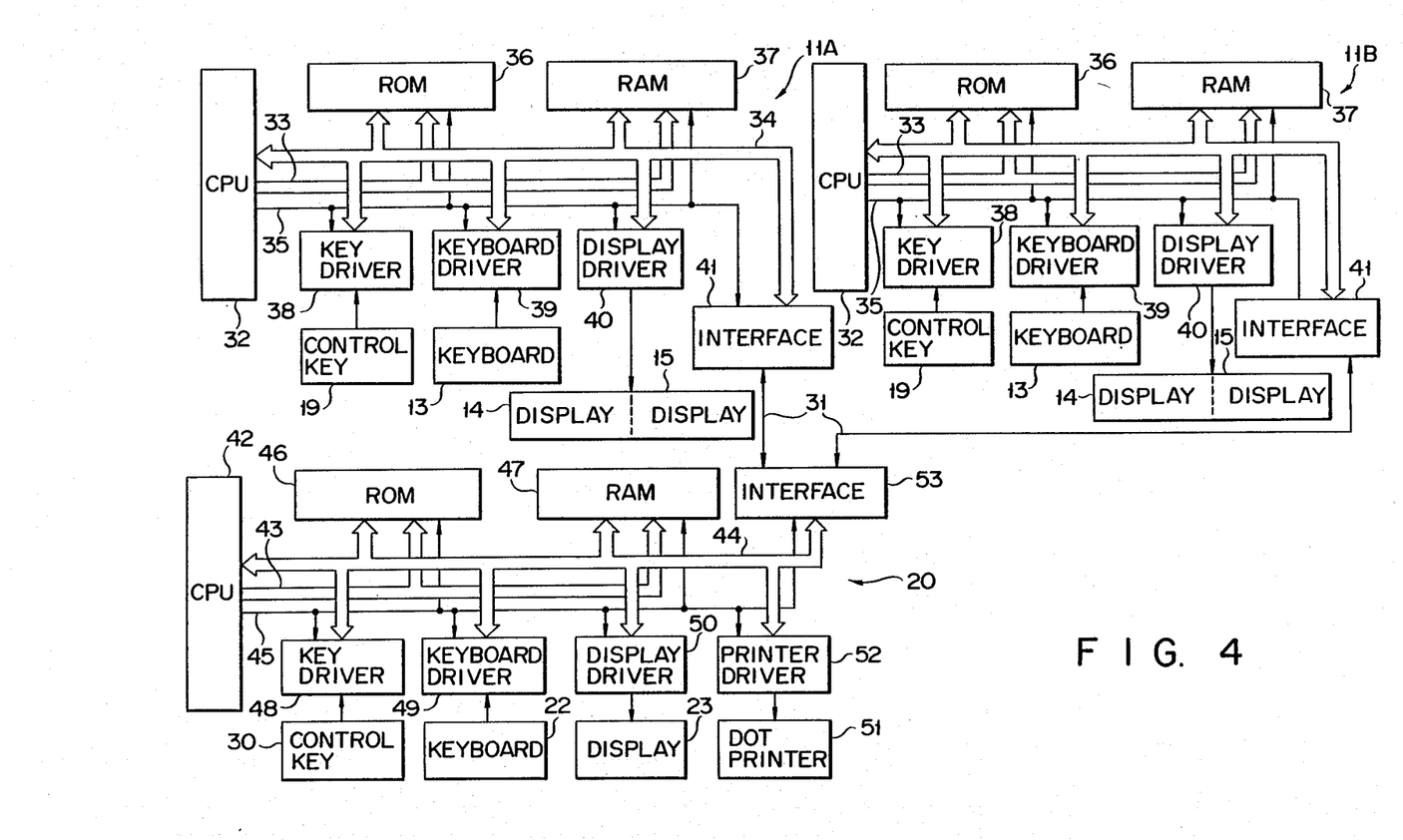
FIG. 4 is a block diagram of the sales data registration apparatus according to the embodiment.

FIG. 4 is a block diagram showing the overall configuration of the present sales data registration apparatus. The apparatus comprises two register terminals 11A and 11B of an identical arrangement and one electronic cash register 20 connected thereto through transmission lines 31. The identical reference numerals in terminals 11A and 11B denote identical parts.

In each of register terminals 11A and 11B, central processing unit (CPU) 32 incorporates arithmetic and logic circuits to perform various arithmetic operations. CPU 32 is connected, through address bus 33, data bus 34, and control line 35, to ROM 36 for storing permanent data such as operation programs and RAM 37 for storing sales data such as sales amounts of individual articles inputted through the operation of keyboard 13. CPU 32 is connected, through data bus 34 and control line 35, to control key driver 38 for receiving an instruction signal from control key 19, keyboard driver 39 for receiving a key signal from keyboard 13, display driver 40 for supplying a display signal to displays 14 and 15, and electronic cash register 20 through transmission lines 31.

In electronic cash register 20, CPU 42 performs various arithmetic operations on the basis of input information entered at keyboard 22. CPU 42 is connected, through address bus 43, data bus 44, and control line 45, to ROM 46 for storing permanent data such as operation programs and RAM 47 for storing variable data such as sales data and total amount data sent from terminals 11A and 11B. CPU 42 is also connected, through data bus 44 and control line 45, to control key driver 48 for receiving an instruction signal from control key 30, keyboard driver 49 for receiving a key signal from keyboard 22, display driver 50 for sending a display signal to display 23, printer driver 52 for dot printer 51 for printing sales data and total amount data on a receipt, and interface 53 connected to terminals 11A and 11B through transmission lines 31.

Figure 5:
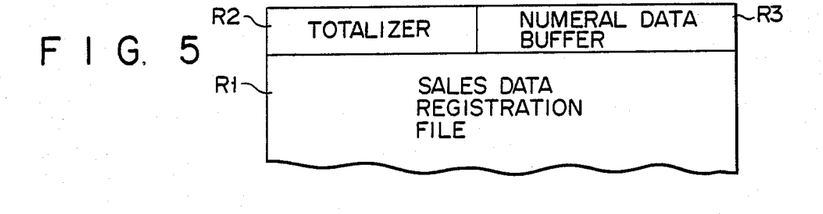
FIG. 5 is a memory map showing part of a RAM in the register terminal used in the sales data registration apparatus shown in FIG. 4.

As shown in FIG. 5, each RAM 37 of terminals 11A and 11B comprises sales data registration file R1 for accumulating sales data such as sales amounts of articles and the total amounts thereof for each DPT code, totalizer R2 for calculating a total amount of articles sold to one customer, and numeral data buffer R3 for temporarily storing numeral data entered with numeral keys 16

Figure 6A:
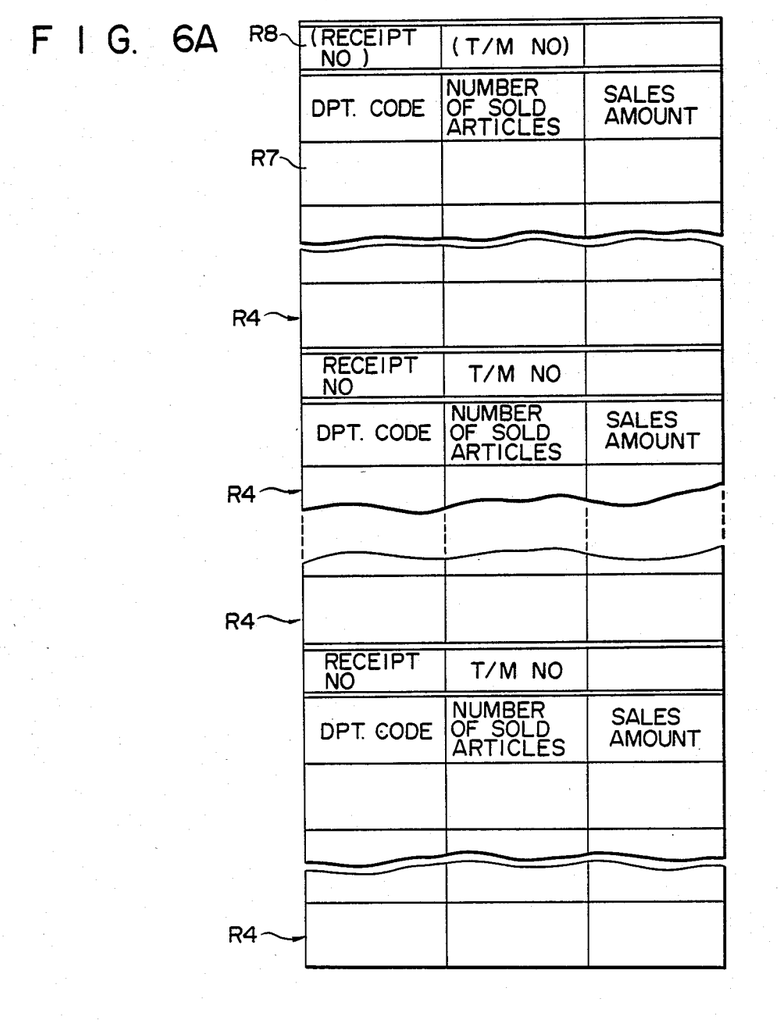
FIGS. 6A to 6C are memory maps showing part of a RAM in the electronic cash register used in the sales data registration apparatus shown in FIG. 4.

RAM 47 in electronic cash register 20 includes a plurality of item buffers R4 for temporarily storing sales data for each customer sent from each of terminals 11A and 11B, and total amount buffers R5 and R6 respectively corresponding to terminals 11A and 11B and each storing a total amount per customer sent from each of terminals 11A and 11B, as shown in FIG. 6A. Buffers R4, R5, and R6 constitute the data memory.

Item buffer R4 shown in FIG. 6A comprises a plurality of data areas R7 for storing sales data including DPT codes of articles sold to each customer, the number of articles sold to each customer, and a sales amount of each customer, and area R8 for storing receipt No. data and terminal No. (T/M No.) data for specifying terminal 11A or 11B from which the sales data is sent.

Figure 6B:
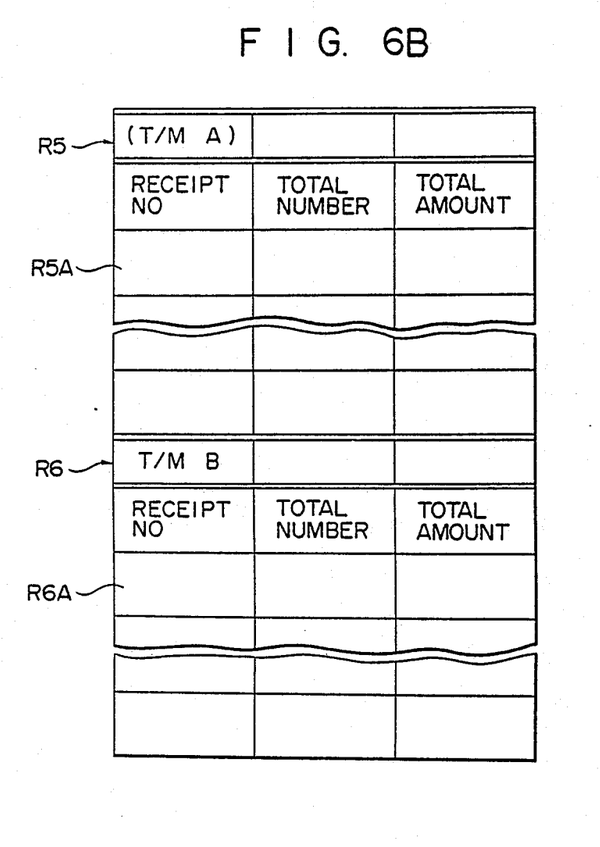

Total amount buffers R5 and R6 shown in FIG. 6B, respectively corresponding to register terminals 11A and 11B, each have pluralities of data areas R5A and R6A for storing respective total amounts of individual customers and the respective numbers of sold articles, which are sent from terminals 11A and 11B, and receipt Nos. corresponding to item buffers R4.

Figure 6C:
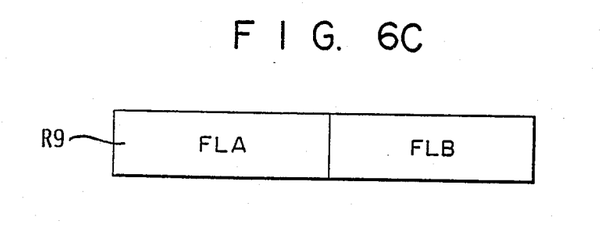

As shown in FIG. 6C, RAM 47 comprises flag area R9 for storing flag FLA or FLB representing which of register terminal 11A or 11B is operated Flag FLA or FLB is set at logic "1" every time sales data is input from terminal 11A or 11B. When sales amount data is input, flag FLA or FLB is reset to logic "0".

Figure 7:
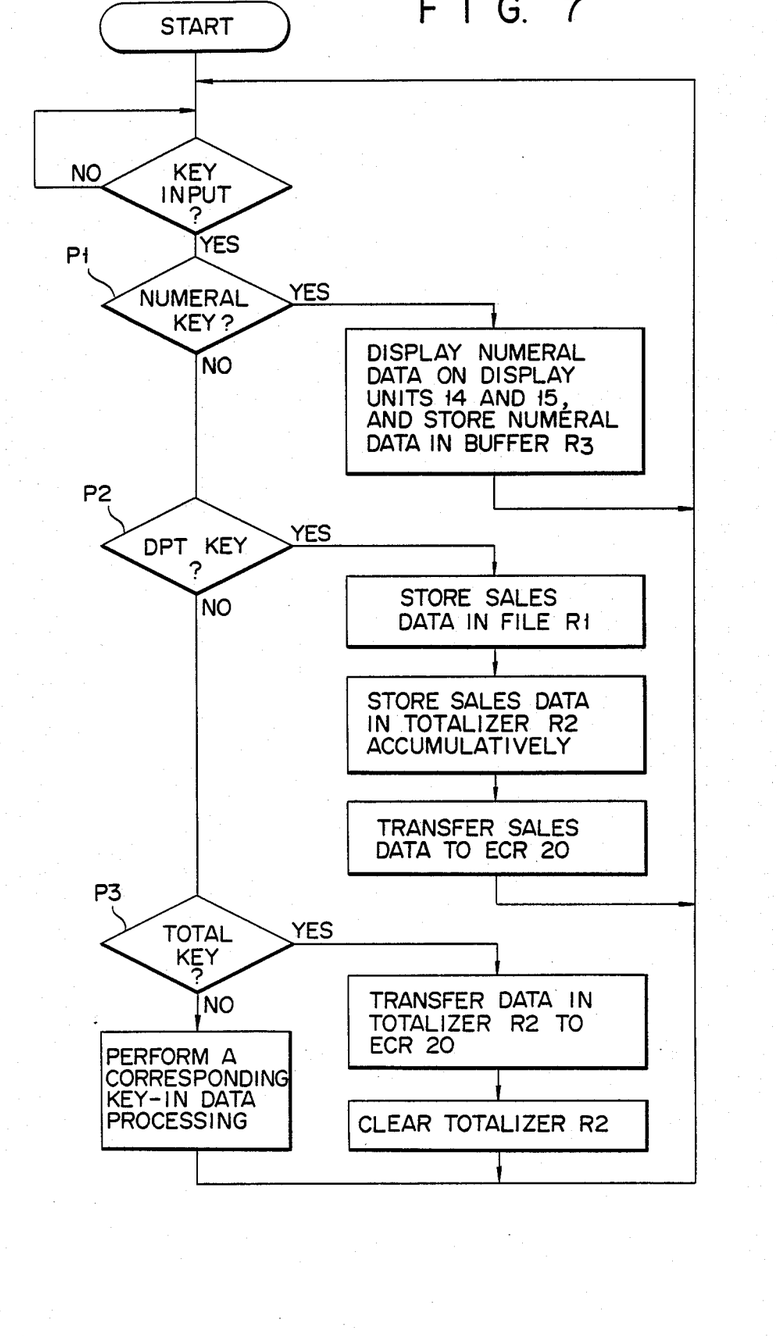
FIG. 7 is a flow chart for explaining the operation of the register terminal.

CPU 32 in each of register terminals 11A and 11B is operated according to a program stored in ROM 36 so as to execute a main routine of FIG. 7 after various initialization operations are completed. When the main routine is started, CPU 32 waits until a key signal is input from keyboard 13. When the key signal is input, CPU 32 checks the type of key signal. In step P1, if the input key signal represents a key or keys belonging to numeral keys 16, numeral data is displayed on displays 14 and 15, and at the same time, stored in buffer R3 in RAM 37.

If the input key signal represents one of DPT keys 17 in step P2, the corresponding DPT code of the sold article is input. In this case, the numeral data stored in numeral data buffer R3 is discriminated as a sales amount. Sales data representing the DPT code, the sales amount, and the number of sold articles is stored in sales registration file R1. Sales amount data is added to that stored in totalizer R2. The sales data for the DPT code, the sales amount, and the number of sold articles is sent to electronic cash register (ECR) 20 through transmission line 31.

In step P3, if the key signal represents total key 18, CPU 32 determines that registration of all articles sold to one customer has been completed. A total amount accumulated in totalizer R2 is sent to cash register 20 through interface 41. Then, the contents of totalizer R2 are cleared.

Figure 8:
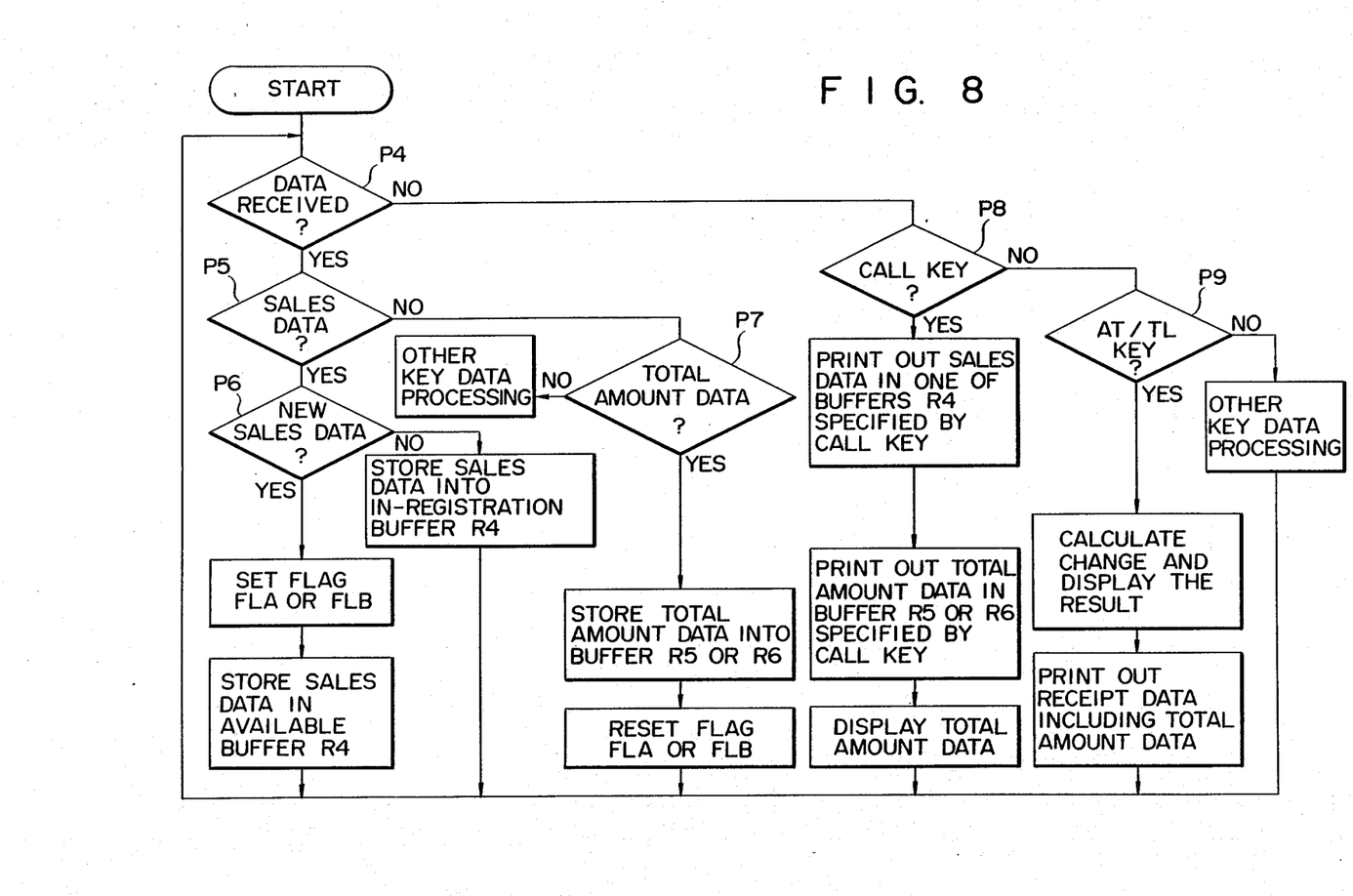
FIG. 8 is a flow chart for explaining the operation of the electronic cash register.

CPU 42 in electronic cash register 20 is operated according to the program stored in ROM 46 so as to execute a main routine of FIG. 8 after various initialization operations are completed. In step P4, when data from one of terminals 11A and 11B is received by interface 53, CPU 42 checks the type of reception data. This is done by, for example, attaching a specified code to each sales data and checking the presence of the specified code. If the reception data represents sales data in step P5, CPU 42 checks in step P6 whether sales data is the one of a new customer. More specifically, if the register flag FLA or FLB corresponding to one of terminals 11A and 11B which has transmitted data is reset to logic "0" in flag area R9, reception data is determined as new data. In this case, corresponding flag FLA or FLB is set to logic "1", and CPU 42 searches RAM 47 for an available one of item buffers R4. Sales data including the DPT code, the number of sold articles, and the sale amount is stored in data area R7 in available item buffer R4. At the same time, a new receipt No. and a new T/M No. of terminal 11A or 11B are stored in area R8.

However, when CPU 42 determines in step P6 that the sales data is not for a new customer, i.e., if flag FLA or FLB, corresponding to one of terminals 11A and 11B which has transmitted the sales data, is set at logic "1", the item buffer R4 in registration state is accessed. The item buffer R4 to be accessed has a receipt No which is not yet written into total amount buffer R5 or R6 and has sales data in stored data area R7. The input sales data is written into available data area R7 in the thus accessed item buffer R4.

If the input data is determined as total sales amount data in step P7, this data is stored in an available data area of total amount buffer R5 or R6 corresponding to terminal 11A or 11B which has transmitted the total sales amount data. At the same time, CPU 42 searches item buffer R4 which is in registration state and calculates a total number of sold articles stored in the data areas R7 of item buffer R4. The total number is stored in the available data area of buffer R5 or R6. The receipt No. data is read out from area R8 of corresponding buffer R4 and is stored in an available data area of corresponding buffer R5 or R6. Thereafter, flag FLA or FLB for operated terminal 11A or 11B is reset to logic "0".

Figure 9:
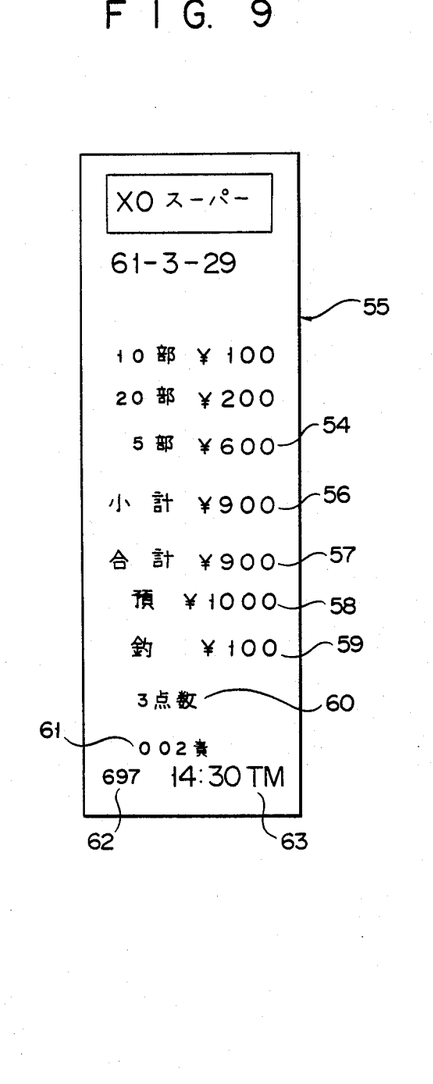
FIG. 9 is a plan view of a receipt issued by the sales data registration apparatus shown in FIG. 4.

In step p8, when a key signal representing one of call keys 29 to designate register terminal 11A or 11B is input instead of data, CPU 42 detects item buffer R4 storing the smallest or earliest receipt No., among item buffers R4 storing sales data from terminal 11A or 11B. As shown in FIG. 9, sales data 54 stored in data area R7 of item buffer R4 is printed by dot printer 51 on receipt 55. A total amount stored in buffer R5 or R6 for terminal 11A or 11B is printed as subtotal amount 56 on receipt 55. At the same time, the total amount is displayed on display 23.

In step P9, if CPU 42 determines that a key signal represents AT/TL key 28, CPU 42 checks the amount tendered (AT) entered by numeral keys 26 before AT/TL key 28 is depressed. CPU 42 subtracts the total amount from the amount tendered to calculate change. Change is displayed on display 23. Receipt data including total amount 57, amount tendered 58, change 59, the number 60 of sold articles, cashier No. 61, receipt No. 62, and time 63 is printed on receipt 55. The printed receipt is discharged from receipt issuing port 24.

In this way, all sales registration operations for one customer are completed. Data areas in item buffer R4 and total amount buffer R5 or R6 are cleared after data therein is printed on receipt 55.

When sales data of an additional article is keyed in with numeric keys 26 and DPT key 27 before depression of AT/TL key 28 in step P9, this sales data is immediately printed on receipt 55. At the same time, the sales amount of the additional article is added to the total amount read out from total amount buffer R5 or R6, and the results are printed on the receipt.

In the sales registration apparatus having the arrangement described above, the customer goes to one of register terminals 11A and 11B installed on the sales area side and pays money at electronic cash register 20 located on the exit side and receives receipt 55.

On the store side, article data of articles sold to the customers is continuously registered by terminal 11A or 11B, and sales data of registered articles is continuously stored in item buffer R4 in electronic cash register 20. When registration of all articles sold to one customer is completed, the total amount is stored in total amount buffer R5 or R6 in electronic cash register 20.

Figure 10:
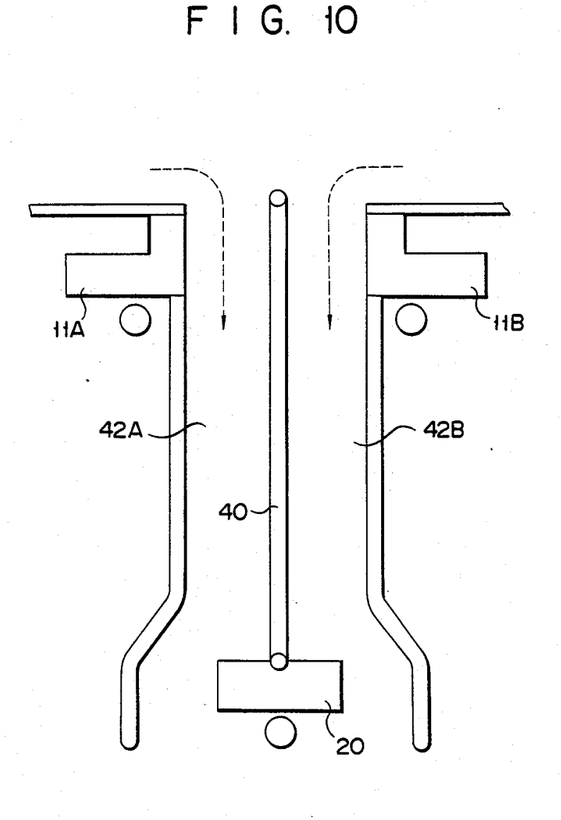
FIG. 10 is a plan view showing the arrangement of the register terminals and one electronic cash register.

The customer who finishes registration of purchased articles at register terminal 11A or 11B goes to electronic cash register 20 along one of paths 42A and 42B divided by partition wall 40, as shown in FIG. 10.

When the customer who finishes registration of purchased articles comes to cash register 20, the cashier at cash register 20 judges which terminal has registered the sales data for this customer and depresses corresponding call key 29. Sales data and total amount (subtotal) are printed on receipt 55, and the subsequent sales transaction (settlement) is performed.

Since two register terminals 11A and 11B are used only to register the sold articles and one electronic cash register 20 performs settlement operations and issues receipt 55, the loads of cashiers at terminals 11A and 11B and cash register 20 are equalized as compared with a conventional two-cashier electronic cash register system. In addition, the waiting time of customers can be shortened to improve checkout counter service. In this manner, efficiency of all the sales registration operations can be improved.

In the sales registration apparatus described above, a large number of item buffers R4 and a large number of data areas in total amount buffers R5 and R6 are arranged to simultaneously store sales data and total amounts of many customers. Therefore, even if many customers are waiting at cash register 20, terminals 11A and 11B can continue to register the sold articles of new customers. Therefore, sales registration operations can be further improved.

The present invention has been described with reference to the particular embodiment. However, the present invention is not limited to this. Various changes and modifications may be made within the spirit and scope of the invention. In the above embodiment, two register terminals are connected to one electronic cash register However, three or more register terminals can be connected to one electronic cash register.

Sales data can be transferred to electronic cash register 20 not when DPT key 17 is depressed but when total key 18 is depressed. Further, it is possible to determine whether the input data to electronic cash register 20 is transmitted form register terminal 11A or 11B by attaching identification data to each input data. In this case, interface 53 may use the same input port to receive the sales data and the like from register terminals 11A and 11B.

What is claimed is:

1. A sales data registration and payment settlement apparatus, comprising:
 a plurality of register terminals each having a keyboard with a plurality of operation keys including a total key, first memory means, and first control means including:
  means for writing, in said first memory means, sales data and total sales amount data for each customer;
  means for generating the sales data and the total sales amount data upon operation of said operation keys;
  means for reading out the sales data and the total sales amount data from said first memory means; and
  means for transmitting the read out sales data and total sales amount data, upon operation of at least one operation key; and
 an electronic cash register having input for receiving data output from said register terminals, a plurality of second memory means for storing sales data and total sales amount data received from said register terminals or each customer, a plurality of call keys each for designating a different one of said register terminals, printing means, and second control means including:
  means responsive to operation of each of said call keys, for reading out, from a corresponding one of said plurality of second memory means, the sales data and the total sales amount data for one customer, received from one of said register terminals designated by one of said call keys; and
  means for driving said printing means to print the read out data on a receipt;
 wherein said first control means in each of said register terminals includes means for attaching a receipt number to said sales data and said total sales amount data for each customer, the receipt number being incremented each time said sales data and said total sales amount data are transmitted, and said reading out means of said second control means in said electronic cash register reads out from one of said second memory means the sales data and the total sales amount data for the customer having the earliest receipt number received from the register terminal designated by one of said call keys.

2. An apparatus according to claim 1, wherein each of said register terminals further comprises display means, and each of said first control means of said register terminals causes said display means to display sales data upon operation of said operation keys.

3. An apparatus according to claim 2, wherein said electronic cash register further comprises display means, and said second control means of said electronic cash register includes means responsive to operation of said one of said call keys, for reading out from one of said second memory means the data received from one of said register terminals which is designated by one of said call keys, and for displaying the data on said display means.

4. An apparatus according to claim 1, wherein said electronic cash register further comprises display means, and said second control means of said electronic cash register includes means responsive to operation of said one of said call keys, for reading out from one of said second memory means the data received from one of said register terminals which is designated by one of said call keys, and for displaying the data on said display means.

5. A sales data registration and payment settlement apparatus, comprising:
 means for defining two paths both having an exit side;
 first and second register terminals each having a keyboard with a plurality of operation keys including a total key, first memory means, and first control means including:
  means for writing, in said first memory means, sales data and total sales amount data for each customer;
  means for generating the sales data and the total sales amount data upon operation of said operation keys;
  means for reading out the sales data and the total sales amount data from said first memory means; and
  means for transmitting the read out sales data and total sales amount data upon operation of at least one operation key; and
 an electronic cash register arranged at the exit side of said paths, and having input means for receiving data transmitted from said first and second register terminals, a plurality of second memory means for storing sales data and total sales amount data received from said register terminals for each customer, first and second call keys each for designating a different one of the first and the second register terminals, printing means, and second control means including:
  means responsive to operation of one of said call keys, for reading out, from a corresponding one of said plurality of second memory means, the sales data and the total sales amount for one customer, received from one of said first and said second register terminals designated by one of said call keys; and
  means for driving said printing means to print the read out data on a receipt;
 wherein said first control means in each of said register terminals includes means for attaching a receipt number to said sales data and said total sales amount data for each customer, the receipt number being incremented each time said sales data and said total sales amount data are transmitted, and said reading out means of said second control means in said electronic cash register includes reads out from one of said second memory means the sales data and the total sales amount data for the customer having the earliest receipt number received from the register terminal designated by one of said call keys.

6. An apparatus according to claim 5, wherein each of said register terminals comprises display means, and each of said first control means of said register terminals includes means for causing said display means to display sales data upon operation of said operation keys.

7. An apparatus according to claim 6, wherein said electronic cash register further comprises display means, and said second control means of said electronic cash register includes means responsive to operation of said one of said call keys, for reading out from one of said second memory means the data received from one of said register terminals which is designated by one of said call keys, and for displaying the data on said display means.

8. An apparatus according to claim 5, wherein said electronic cash register further comprises display means, and said second control means of said electronic cash register includes means responsive to operation of said one of said call keys, for reading out from one of said second memory means the data received from one of said register terminals which is designated by one of said call keys, and for displaying the data on said display means.

* * * * *